UNITED STATES PATENT OFFICE.

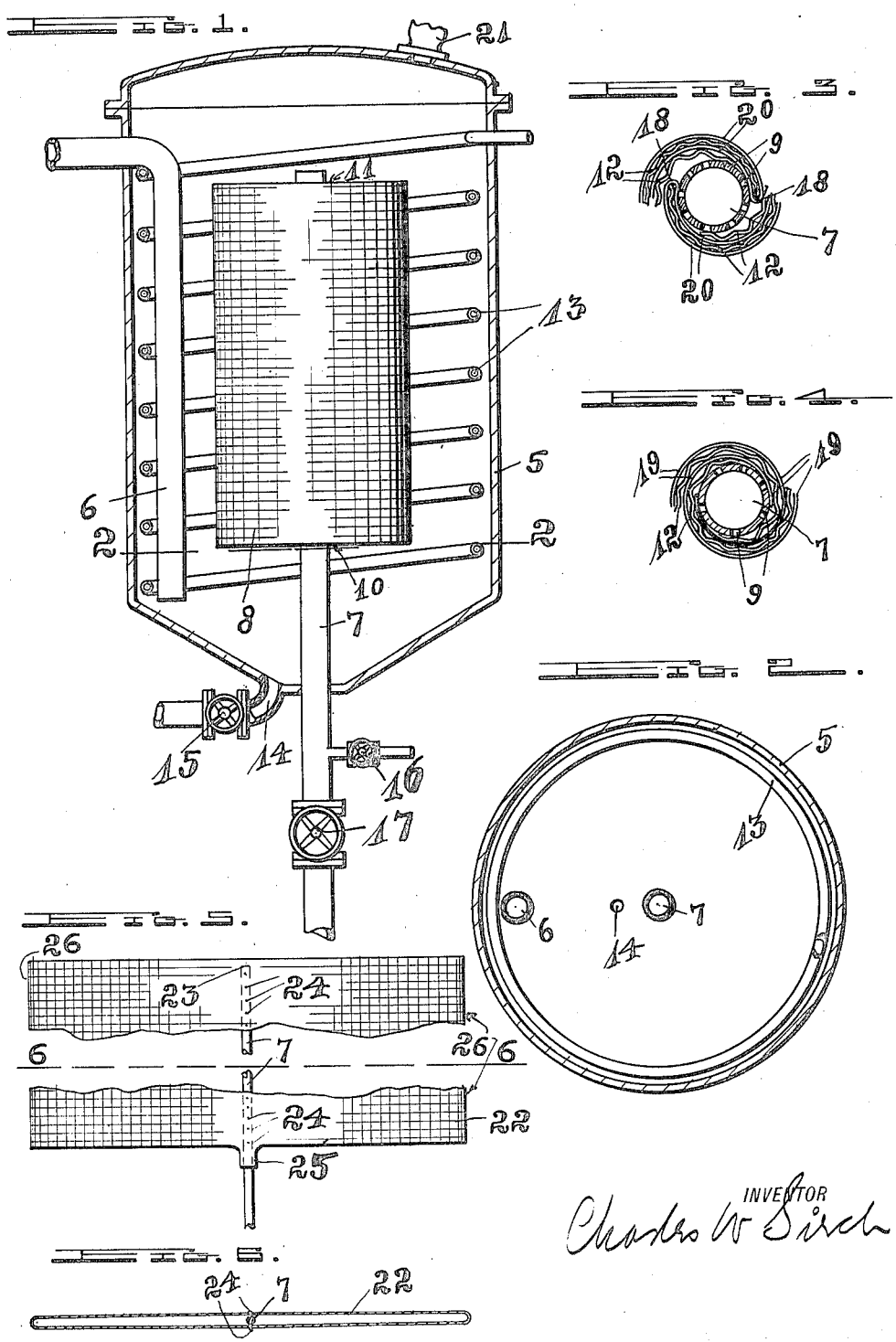

CHARLES W. SIRCH, OF LOS ANGELES, CALIFORNIA.

FILTER.

1,398,205. Specification of Letters Patent. Patented Nov. 22, 1921.

Application filed May 16, 1919. Serial No. 297,577.

*To all whom it may concern:*

Be it known that I, CHARLES W. SIRCH, a citizen of the United States, residing at Los Angeles, in the county of Los Angeles and State of California, have invented a new and useful Filter, of which the following is a specification.

This invention relates to devices for filtering fluids.

One of the objects of this invention is to filter fluids at any temperature.

Another object is to prevent the filtering medium from being lifted or moved any farther than is absolutely necessary for the cleaning of such medium during the ordinary backwash.

Another object is to rigidly hold the filtering medium in its position during the filtering process as well as during the backwash.

Another object is to use layers of fabric and spacing means alternately.

Another object is to provide layers of fabric and spacing means wound upon the outlet pipe alternately.

Another object is to provide layers of fabric and spacing means alternately so that it will stay closed one layer upon the other during the normal filtering process, while it is in a position to become spaced more than normally during the backwash.

Another object is to provide layers of fabric and spacing means alternately so that it will become tightly wound during the normal filtering process, while it will become unwound during the backwash.

Another object is to provide layers of fabric and screens wound around the outlet pipe, the screen having the capacity to hold the layers together during the normal filtering process, while it is adapted to unwind a suitable distance during the backwash so as to allow a good cleaning of the filter medium in such an unwound position.

Another object is to provide windings of fabric and spacing means so that under normal filtering process the pressure will come from the outside of the windings thereby pressing this wound filtering medium closely together, while during the cleaning procedure the pressure is directed from the inside of the windings toward the outside thereby loosening up such windings, facilitating the cleaning of the medium.

Another object is to obtain a large area of filtering surface within a small volume.

Another object is to provide a device which can be cleaned by vibrating and shaking of the filtering medium thereby shaking the sediment from the medium without dislocating the filtering medium in the least.

Another object is to provide a device in which bags can advantageously be used by disposing spacing means into the bag and between the different layers of the bags, or, when wound as disclosed above, disposing such spacing means in and on the outside of the bags so as to bring always alternately one layer of fabric of the bag and one layer of spacing means into such windings.

Another object is to provide means for facilitating a quick and thorough cleaning of the medium by changing the pressure during the cleaning or backwash automatically, as by pop-valve or similar means.

Other objects will appear from the following description and appended claims as well as from the accompanying drawing, in which—

Figure 1 is a vertical sectional view of the device.

Fig. 2 is a horizontal section on line 2—2 of Fig. 1.

Fig. 3 is an enlarged cross section of the outlet pipe with a fragmentary portion of bags wound around the pipe.

Fig. 4 is a similar view with layers of fabric wound around the pipe.

Fig. 5 is a side elevation of a bag drawn over the outlet pipe in flat unwound position, in somewhat reduced scale.

Fig. 6 is a cross section on line 6—6 of Fig. 5.

The casing 5 incloses the whole device. An inlet pipe 6 is disposed in the casing terminating at a suitably low part of the casing. An outlet pipe 7 is disposed in the casing extending from the bottom upwardly to a suitable point. A body 8 of fabric or other similar material is wound around the outlet pipe constituting the filtering medium of this device. The outlet pipe 7, closed at the upper end, is provided with a suitable number of perforations 9, see Figs. 3 and 4, these perforations naturally are in the pipe 7 between points inside of the lower end 10 and the upper end 11 of the filtering medium, so as to cause the fluids to pass through the filtering medium before passing out through the perforations in the outlet pipe.

The fluids, entering the device through the inlet pipe 6, and having to pass through the filtering medium to get to the perforations of the outlet pipe, naturally cause a certain packing effect upon the filtering medium around the outlet pipe. To prevent a too tight packing of the filtering medium, suitable spacing means, as wire, screens, or other similar materials, are placed between each two layers of filtering medium. A coil 13 is disposed in the casing for heating or cooling the fluids to proper temperature. A drain pipe 14 with a drain valve 15 is provided at the bottom of the casing. For backwashing this device, an extra valve 16 is provided just above the discharge valve 17 in the outlet pipe. An injection of steam, water, air or other suitable means through the valve 16 produces an unwinding effect upon the filtering medium, as will easily be understood, such backwash coming out of the perforations in the outlet pipe from the inside of the windings. Such unwinding produces a shaking-off of all the sediment on the filtering medium, which effect can be increased by providing a pop valve preferably on the top of the device, as at 21.

The arrangement in Figs. 5 and 6 is the preferred construction of filtering medium, a bag 22 being drawn over the outlet pipe 7 so that the top end 23 of the outlet pipe abuts against the inside of the bag. The bag is then fastened along practically its middle to the outlet pipe as at 24, and the open lower end 25 is hermetically closed and tied to the outlet pipe, so that the whole bag is suitably supported by the outlet pipe. The two flaps extending from the outlet pipe 7 to the ends 26 are, of course, made of such length as to allow a winding around the outlet pipe a suitable number of times.

Before winding, however, spacing means are disposed in the bag, and, while winding, other spacing means are placed between the different layers in the winding of the bag around the outlet pipe. Such winding and placing of spacing means will more readily be understood with reference to Figs. 3 and 4.

In Fig. 3 is a slightly modified form, two bags being used in the windings, one of the edges of each bag being fastened along the outlet pipe at opposite sides, as at 18 commencing and then with the spacing means 12 wound around the outlet pipe 7. Such bags are naturally only fragments of whole bags which can be wound around the outlet pipe a suitable number of times to form a suitable body of filtering medium.

In Fig. 4 is another slightly modified form of arrangement, two layers of fabric 19, commencing at opposite sides of the outlet pipe are wound around the outlet pipe in a similar manner as described above.

Having thus described my invention, I claim:

1. In a filter in combination with a casing, an inlet pipe and a perforated outlet pipe provided on the casing; a filtering medium comprising layers of fabric and spacing means disposed between the layers of fabric, the spacing means forming the supporting member of the medium and having means for attaching the whole width of the medium at one edge to one side of the outlet pipe of the casing so as to allow a winding of the medium for several times around the pipe.

2. In a filter, a casing, an inlet pipe and a perforated outlet pipe provided on the casing, filtering medium wound around the perforated outlet pipe, and spacing means wound with the filtering medium around the outlet pipe forming the supporting means for the filter medium adapted to hold the filtering medium in a closely wound position during the normal filtering process and adapted to become spaced more than normally during the backwash.

In testimony that I claim the foregoing as my invention I have signed my name in the presence of two subscribing witnesses.

CHARLES W. SIRCH.

Witnesses:
LAURA POPE,
LILLIAN P. ODEMAD.